Sept. 22, 1970   J. C. JUREIT   3,529,918
HIDDEN FASTENER

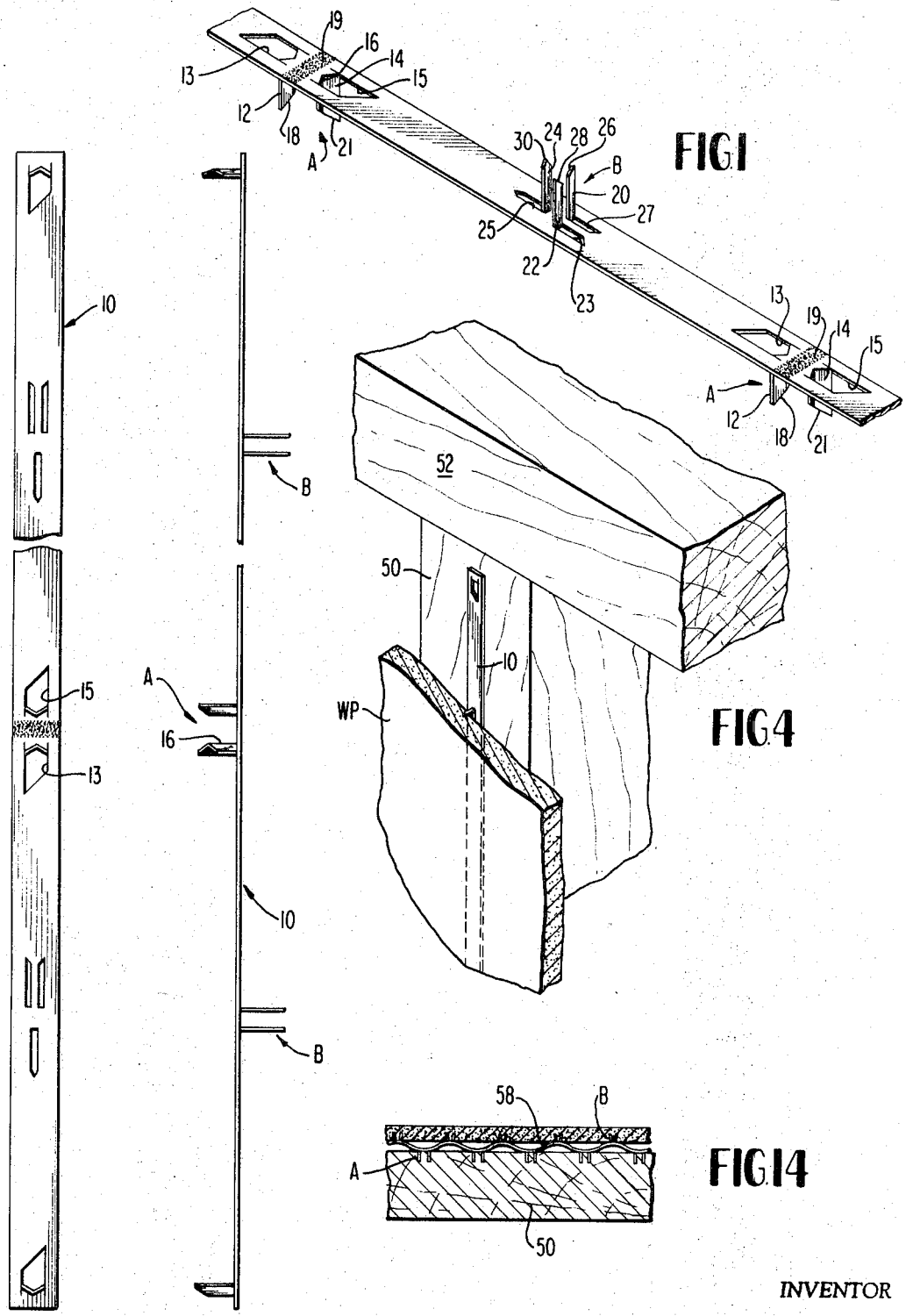

Filed Aug. 6, 1968   3 Sheets-Sheet 2

INVENTOR
JOHN CALVIN JUREIT

BY   *Le Blanc & Shur*

ATTORNEYS

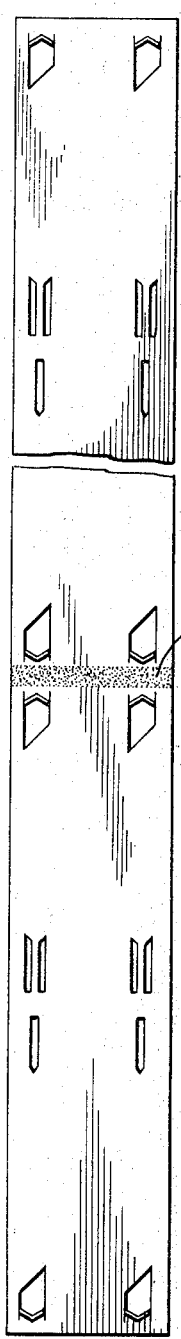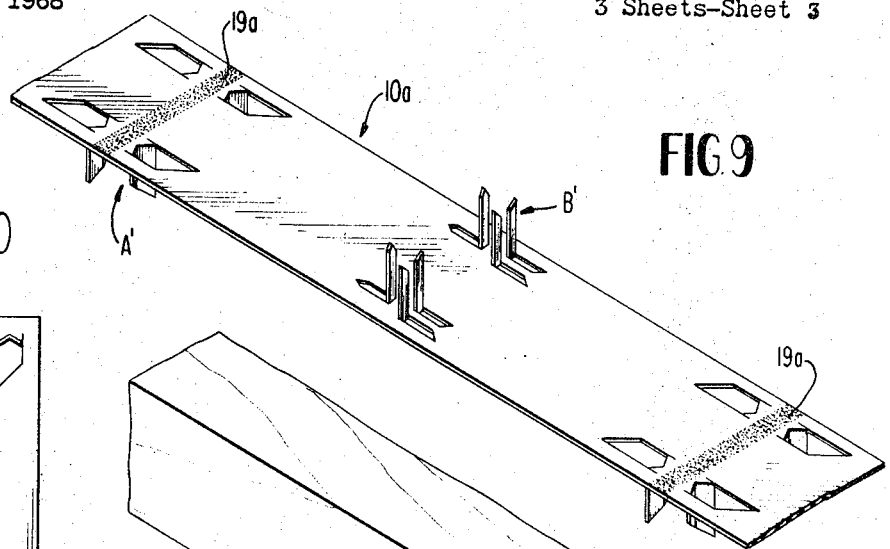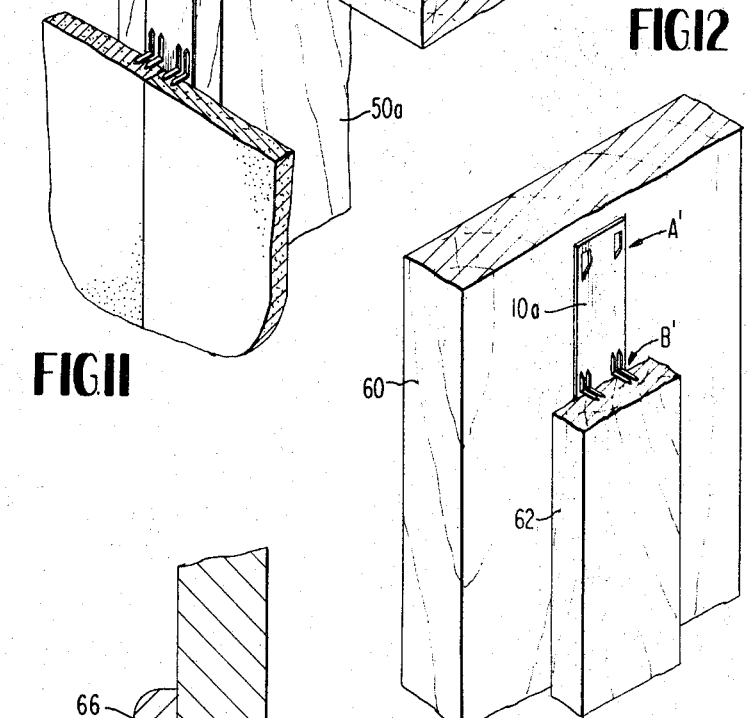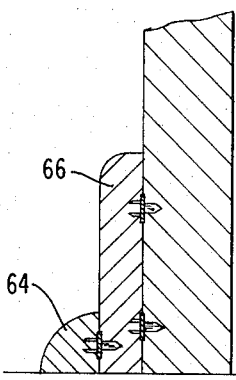

United States Patent Office 3,529,918
Patented Sept. 22, 1970

3,529,918
HIDDEN FASTENER
John Calvin Jureit, Coral Gables, Fla., assignor to Automated Building Components, Inc., Miami, Fla., a corporation of Florida
Filed Aug. 6, 1968, Ser. No. 750,740
The portion of the term of the patent subsequent to Oct. 14, 1986, has been disclaimed
Int. Cl. F16b 15/00
U.S. Cl. 85—13                33 Claims

ABSTRACT OF THE DISCLOSURE

In one form, the hidden fastener comprises a strip of 26 or 28 U.S. Standard gauge sheet metal having a single row of longitudinally spaced groups of teeth struck therefrom to extend normal to and from opposite sides of the strip. In another form, the groups of teeth are formed in two lengthwise extending laterally spaced rows of teeth. The teeth of each group are equally longitudinally spaced one from the other, and one group comprises a pair of scarfed end nail-like teeth struck about axes transverse to the longitudinal axis of the strip such that the teeth lie in back-to-back relation and the openings left thereby in the strip extend in opposite directions from the teeth. These teeth provide a lateral clinching action when driven into a stud. The other group comprises three teeth struck about axes transversely of the longitudinal axis of the strip and forming an isosceles triangular configuration, the openings left in the strip formed by the teeth comprising the base of the triangle extending from such teeth in a direction opposite to the opening formed in the strip left by the third tooth. The tips of the base teeth have scarfed ends for lateral clinching action and the third tooth is beveled for movement away from the base teeth as a wall panel is pressed toward the stud driving the triangularly arranged group of teeth into the panel, thereby securing the panel to the stud and providing a triangular clinching action.

BACKGROUND OF THE INVENTION

This application is a continuation-in-part of application Ser. No. 682,223 filed Nov. 13, 1967 now U.S. Pat. No. 3,472,118, issued Oct. 14, 1969.

This invention relates to connecting devices for wall panels, door jambs, window jambs, trim molding and the like. More particularly, the present invention relates to a tape-like nail of the hidden fastener type for fastening sheathing, wallboard, and the like to studding, for securing door and window jambs, trim molding and the like to adjoining support structure, to the joints formed thereby, and to methods of applying the wall panel sheathing or the like and fastener to studding.

In the wooden building construction industry, the problem of readily and easily attaching wallboard, paneling, jambs, molding, trim and the like to studding or other support structure as the case may be has been an ever present one, even to this date, as evidenced by the fact that nails are still commonly employed for these purposes. Many solutions have been proposed to avoid nailing through the paneling, jambs, trim, molding and the like into the supporting structure particularly to eliminate the problem of covering up exposed nailheads. This problem becomes acute wherein prefinished material, such as prefinished paneling, is employed as it is expensive and time consuming to cover the nailheads with a spackling material having like texture, color, grain, etc., as the prefinished wall material. This problem is additionally compounded where decorative sheet material such as vinyl or Tedlar coverings are secured to the exposed surfaces of molding, jambs and the like.

A multitude of prior fasteners, some of which are of the hidden fastener type, have heretofore been proposed, one of which is disclosed in U.S. Pat. No. 3,261,137 dated July 19, 1966, of common inventorship herewith. In this patent, longitudinally spaced groups of three teeth each are struck from a sheet metal plate to extend normal thereto in transverse side-by-side relation, each group alternately extending in opposite directions from the plate whereby a wallboard may be connected to a stud by pressing the wallboard toward the stud, thereby driving the oppositely struck groups of teeth into the stud and wallboard. This has proved to be very satisfactory. However, the dies for forming this type of tooth configuration are difficult and expensive to construct. Moreover, while the resistance to withdrawal of the tripod teeth of this patent has been found satisfactory in most applications, the clinching action of these tripod teeth acts only in a very limited area of the wallboard, panel or the like.

Additionally, the fastening strip of that patent holds the wallboard firmly against the strip with the strip being rigidly fixed to the studding. It is known that the sound absorption property of a material is a function of surface porosity and/or dissipative surface vibration. Unless the wallboard per se is specifically constructed to provide a sound absorbing surface which is aesthetically undesirable in the case of wood paneling, it is seen that a wallboard joined to studding by the fasteners of the above-noted patent, as well as all other fasteners of this type known to me, cannot provide soundproofing qualities due to the rigidity of the connection thereof with the studding.

SUMMARY OF THE PRESENT INVENTION

The present invention provides a nail of the hidden fastener type comprising a tape-like strip of thin sheet metal on the order of 26 or 28 U.S. Standard gauge having a plurality of longitudinally spaced groups of teeth struck therefrom and alternately extending from and lying normal to opposite faces of the strip. The groups of teeth or nails extending from one face of the strip each comprise preferably a pair of teeth struck about axes extending transversely of the longitudinal axis of the strip to lie in back-to-back relation one to the other with the holes left thereby extending from the teeth in opposite directions. The teeth are bent to form a shallow V cross section to reinforce the same and the tips of the teeth are scarfed in opposite directions to provide a lateral clinching action when secured to studding.

The other groups of teeth are likewise struck about transverse axes and project from the opposite face of the strip with each group preferably comprising at least a pair of narrow width teeth or whiskers lying in spaced side-by-side relation one to the other. In the preferred form, a third tooth or whisker is struck to form with the base pair of teeth an isosceles triangular tooth configuration. In another embodiment, an additional pair of whiskers can be struck to form a rectangular tooth configuration with the base pair of whisker teeth. The laterally spaced pair of whisker teeth are struck such that the holes left thereby extend from the teeth in like directions. Where triangular or rectangular whisker teeth configurations are employed, the holes left by the pair of whisker teeth extend from the base thereof in a direction opposite to the direction that the holes left by the additional tooth or teeth, as the case may be, extend from such additional tooth or teeth, such that the pair of teeth and the additional tooth or teeth lie in back-to-back spaced relation. The tips of the paired whisker teeth are scarfed to provide a laterally outward clinching action and this is particularly important wherein thin wall panelling, molding and the like on the order of ¼" thick is employed. In the triangular tooth configuration, the end of the third tooth has a chisel tip which is beveled such that, upon driving the wall panel, molding or the like against the three teeth, the former moves the third tooth in a direction away from the base teeth, thereby providing a spaced triangular clinching action. In the rectangular tooth configuration, the additional pair of whisker teeth have scarfed ends providing a lateral clinching action.

In one embodiment hereof, the nail comprises an elongated narrow strip of sheet metal with a single row of the alternating teeth groups previously described struck therefrom. In another embodiment, the nail comprises an elongated strip of sheet metal having a width sufficient to accommodate a pair of laterally spaced parallel rows of the alternating teeth groups as previously described with the groups of teeth struck in like directions in each row being laterally adjacent one to another. Either type of strip can be employed to join panelling, molding, jambs, trim and the like, to associated supporting structure by driving the scarfed tipped teeth or nails into the supporting structure for the full length of the strip. As a particular feature hereof, the face of the strip lying opposite to such scarfed teeth is marked such that the carpenter knows precisely where to strike the strip with his hammer in order to drive the nails or teeth into the support structure without peening over the whisker type teeth projecting outwardly in the opposite direction. Once the strip is secured to the supporting structure, the panelling, jamb, molding, or the like, can be butted against the outwardly facing teeth of the nail and secured thereto by driving the panelling, etc. as by a rubber mallet toward the supporting structure. These outwardly facing teeth are thus fully embedded into the panel, jamb, molding, trim or the like and secure the latter to the supporting structure without marring or otherwise damaging the outer exposed face thereof.

Specifically and wherein a wall panel is to be secured to studding, a carpenter successively nails the spaced groups of paired scarf-tipped teeth or nails to the studding for the full length of the strip starting at the top of the studding by driving the end nail into the studding and tensioning the strip so that the remaining groups of teeth can be successively embedded. Each pair of nails can usually be embedded with but one hammer blow and the groups of whiskers or outwardly projecting teeth on the opposite face of the strip are each preferably spaced along the strip from the groups of paired nails a distance of about one inch on opposite sides of the latter (the like groups of nails or whiskers preferably lie on two inch centers), so as not to interfere with or be peened by such nailing. The carpenter then butts the wall panel against the studding and drives the wall panel toward the studding, by means of a rubber mallet, starting with the bottom central portion of the panel, to successively embed the whiskers or outwardly projecting teeth into the back of the wall panel, thereby securing the wall panel to the studding. In this manner, the wall panel can be readily and rapidly secured to the studding, even by individuals comparatively unskilled in carpentry work. The lower central portion of the panel is first secured to the studding and then the lower outer edges of the panel are secured to the associated studding. This nailing process is repeated upwardly along the panel until final securement and this prevents bowing of the panel.

When employing the narrow strip fastener with the single row of teeth groups spaced therealong, it will be appreciated that, on the end studs, or those to which the lateral edges of the panels will be secured, a pair of such fasteners are secured to these studs along the outer faces thereof. In this manner, the edges of a pair of adjoining panels can be readily secured to the common stud with the transverse loading being transferred from the edge of one panel through the one narrow strip fastener to the stud and then from the stud through the other narrow strip fastener to the edge of the adjoining panel. Where the wider strip having the two laterally spaced rows of teeth groups is employed, a row of teeth groups will be embedded into each edge portion of the adjoining panels with the transverse loading being transferred directly from one panel to the adjacent panel through the nails or whiskered teeth in each row and the intermediate metal portion of the fastener between the rows. In other words, this loading is not transferred from one panel to the other panel through the supporting stud but rather is transferred directly from one panel to the other via the fastener hereof. A direct splice through the fastener is thus accomplished and this provides a more secure and rigid joint and also eliminates the criticality of the withdrawal resistance of the teeth embedded in the stud insofar as their withdrawal resistance under applied lateral force is concerned.

Moreover, due to the unique configuration of the teeth or whiskers and the relative location of the different groups of teeth along the strip, the present wall panel nail provides a secure and highly efficient wall panel to stud connection and this without nailing through the wall panel. By spacing the wall panel to fastener connection from the fastener to studding connection (eliminating a straight-through connection between the wall panel and studding), the wall panel is not rigidly secured to the studding but rather is free to move very slightly outwardly from the studding. The fastener hereof is formed of very thin sheet metal, preferably on the order of 26 or 28 U.S. Standard gauge, whereby the wall panel may vibrate to a very limited extent in a direction normal to the studding. The wall panel accordingly derives a sound absorbing property from the limited vibration thereof which dissipates impinging acoustical energy. The resistance to withdrawal of both groups of teeth is sufficiently high such that the wall panel remains fixed to the studding notwithstanding the vibratory sound dissipating action of the wall panel.

Accordingly, it is a primary object of the present invention to provide an improved nail of the hidden fastener type.

It is another object of the present invention to provide an improved nail of the hidden fastener type which may be readily and easily applied to supporting structure and which provides a high withdrawal resistance in both the supporting as well as the supported structure.

It is a related object of the present invention to provide an improved tape-like nail of the hidden fastener type which can be widely employed in the wooden building construction industry, for example, to join wall panels, sheathing and the like to studs; and to join door and window jambs, molding, trim and the like to associated supporting structure and the like.

It is still another object of the invention to provide an improved nail of the hidden fastener type in the form of a thin tape-like strip having integral teeth struck therefrom projecting in opposite directions and which may be readily, easily and inexpensively manufactured.

It is a related object of the present invention to provide an improved wall panel to studding joint employing a connector of the hidden fastener type.

It is another related object of the present invention to provide a method of applying a wall panel nail of the hidden fastener type to studding and joining the wall panel to the studding.

It is a further object of the present invention to provide an improved wall panel nail for connecting wall panel to studding whereby such wall panel is afforded sound absorbing properties.

These and further objects and advantages of the present invention will become more apparent upon reference to the following specification, claims and appended drawings.

DESCRIPTION OF THE DRAWING FIGURES

FIG. 1 is a framentary perspective view of a strip of the hidden fastener type nail constructed in accordance with the present invention;

FIG. 2 is a plan view of the nail strip looking at the undersurface thereof as illustrated in FIG. 1 and with portions broken out for ease of illustration;

FIG. 3 is a side elevational view thereof;

FIG. 4 is a fragmentary perspective view illustrating a wall panel to studding connection employing the nailing strip hereof;

FIG. 9 is a view similar to FIG. 1 illustrating another embodiment of the nailing strip hereof;

FIG. 10 is a view of the nailing strip illustrated in FIG. 9 looking at its undersurface;

FIG. 11 is a fragmentary perspective view illustrating a joint formed between adjoining wall panels and a stud employing the nailing strip illustrated in FIG. 9;

FIG. 12 is a fragmentary perspective view illustrating a door jamb to frame connection employing the nailing strip illustrated in FIG. 9;

FIG. 13 is a fragmentary cross section view illustrating floor trim to support structure joints employing the nails illustrated in FIG. 1; and FIG. 14 is a fragmentary cross sectional view illustrating, in greatly exaggerated form, a wall panel to studding joint with the wall panel slightly spaced from the studding for vibratory sound absorbing movement.

DESCRIPTION OF THE PREFERRED EMBODIMENT

Figure 7:
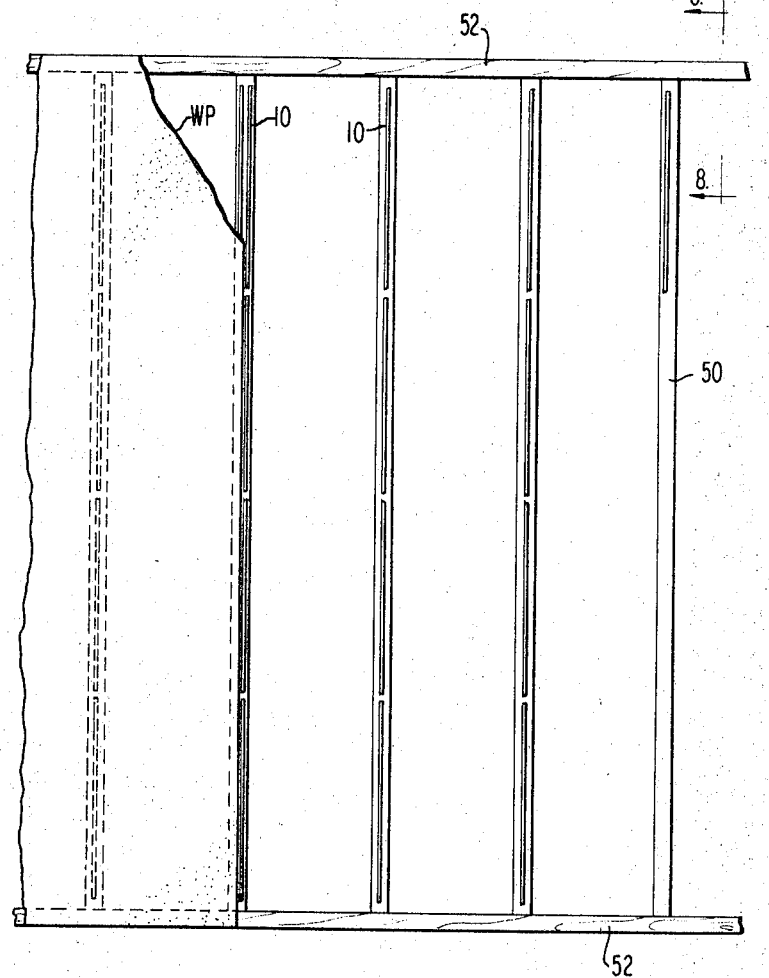
FIG. 7 is a fragmentary elevational view of the studding illustrating the nailing strips and wall panel as they are applied thereto.

Referring to FIGS. 1–3, there is shown a nail of the hidden fastener type generally indicated 10 comprising an elongated narrow tape-like strip of sheet metal, preferably 26 or 28 U.S. Standard gauge, having a plurality of equally spaced groups or clusters of teeth arranged in a single row therealong and alternately projecting from opposite faces thereof. Groups of like teeth indicated at A project from one face of strip 10 while groups of like teeth of a different type indicated at B project from the opposite face of strip 10. The groups of teeth indicated at A each preferably comprise a pair of equal length nail-like teeth 12 and 14 struck about axes extending substantially transversely of the longitudinal axis of strip 10 to project substantially normal to a face of strip 10. Teeth 12 and 14 are struck such that the respective holes 13 and 15 left thereby in strip 10 extend from the respective teeth in opposite directions whereby teeth 12 and 14 lie in longitudinally spaced back-to-back relation one to the other. Teeth 12 and 14 are preferably V-shaped in cross section as at 16 throughout their full lengths, whereby the teeth are longitudinally reinforced. Teeth 12 and 14 have scarf-pointed tips 18 and 20, respectively, which extend laterally in opposite directions to provide lateral clinching action, an edge of each tooth being longer in length than its opposite edge. Longitudinally spaced indicia or marks 9 are provided on the opposite face of strip 10 from which teeth groups A project and between the teeth 18 and 20 of each teeth group A for purposes as will presently become clear.

Each of the groups of teeth indicated at B preferably comprise three teeth or whiskers 20, 22, and 24 struck about axes extending substantially transversely of the longitudinal axis of strip 10 to project substantially normal to the opposite face of strip 10. Whiskers 20, 22, and 24 lie in a substantial isosceles triangular configuration looking lengthwise along the whiskers. The whiskers 20 and 22, which form the base of the triangular configuration, are struck such that the respective holes 21 and 23 left thereby in strip 10 extend from the base of whiskers 20 and 22 in a direction opposite to the direction that the hole 25 left by the third whisker 24 extends from its base, whereby whiskers 20 and 22 lie in longitudinally spaced back-to-back relation with whisker 24. As seen in FIG. 1, base whiskers 20 and 22 have scarf-pointed tips 26 and 28 which extend laterally towards opposite sides of strip 10 and provide a lateral clinching action. The end whisker 24 has a chisel tip as at 30 and it will be seen that whiskers 20, 22, and 24 provide an initial three point triangular contact with a wall panel WP as will be described.

While whiskers 20, 22, and 24, as illustrated, are the preferred form of teeth, other tooth configurations of the slender whisker type teeth may be employed if desired. For example, one or both edges of each whisker tooth may be laterally undercut along its length to provide a series of lateral barbs. This whisker tooth type is particularly effective in softer wall panels wherein the barbs can hook about the fibers of the panel. To reinforce the whisker type teeth, slight laterally extending shoulders may be provided adjacent the base of the whisker tooth, which shoulders would extend from the tooth base partway along the length of the tooth, for example, for one-third of the tooth length. Further, to insure sufficient lateral bending of the whisker teeth, thereby to optimize the clinching action and resistance to withdrawal, the inner edge of each whisker may be tapered from its base outwardly towards its outer edge to form a pointed tip with the outer edge.

Figure 6:
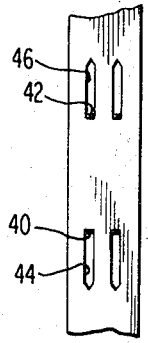
FIG. 6 is a fragmentary plan view of the nailing strip illustrating still another form of whisker teeth.
Figure 5:
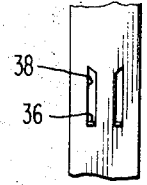
FIG. 5 is a fragmentary plan view of the nailing strip illustrating another form of the whisker teeth thereof.

While the preferred arrangement of the whisker type teeth forming the groups or clusters of whiskers indicated at B comprises an isosceles triangular configuration, as previously described, other arrangements of the whisker type teeth can be provided. For example, as seen in FIG. 5, the whisker type teeth forming the cluster of teeth indicated at B may be comprised solely of a pair of whiskers 36 struck from strip 10 such that the slots 38 left thereby in strip 10 extend from the base of the whiskers in a like longitudinal direction along strip 10 with the whiskers 36 projecting substantially at right angles from strip 10 and in spaced side-by-side relation one to the other. The whisker-type teeth 36 preferably have scarf pointed tips which extend laterally towards opposite sides of strip 10 to provide a clinching action although it will be appreciated that teeth 36 can comprise any one of the tooth configurations previously described. Another arrangement of the whisker-type teeth comprising the clusters of teeth indicated at B is illustrated in FIG. 6. As seen, two pairs of teeth 40 and 42 are struck from strip 10 such that the slots 44 and 46, respectively, left thereby, extend from the base of the teeth 40 and 42 in opposite directions such that the whisker teeth pairs 40 and 42 lie in longitudinally spaced back-to-back relation one to the other. Each pair of teeth 40 and 42 project at substantially right angles from strip 10 and lie in spaced side-by-side relation one to the other with the corresponding teeth in each pair of teeth 40 and 42 lying in substantial longitudinal alignment one with the other. As in the previous embodiment, whisker teeth 40 and 42 have scarfed pointed tips which extend laterally towards opposite sides of strip 10 to provide a clinching action.

It will be understood that strip 10 can be formed of any desired length and the preferred form hereof provides the nail in tape-like strips of about 21 inches long whereby, when employed as a wall panel to stud fastener, four strips located substantially in end-to-end relation along a stud may be provided for nailing the usual eight foot high wall panel thereto. Like nail groups are preferably on about 2 inch centers and this affords adequate spacing between adjacent teeth groups, such that the whisker-type teeth are not flattened or peened when applying the strip to the stud as by a hammer and as noted hereinafter. Like nail groups may, however, be spaced within a range of about 1½ to 4 inches apart without substantially increasing the possibility of peening the outwardly projecting teeth or providing an insufficient number of nails along the strip as to form an ineffectual or weakened joint. It is significant that the ends of each strip are cut to provide at least one of teeth 12 or 14 closely adjacent opposite ends of the strip as noted in FIGS. 2 and 3. In this manner, the strip 10 may be completely secured to the studding along substantially its full length with the end groups of whiskers B supported by the nails of group A on both sides thereof. In this manner, the ends of the tapes are not left hanging or unsupported or the end whiskers supported from only one side of the strip.

Strip 10 is preferably formed of either 26 or 28 U.S. Standard gauge galvanized sheet metal having nominal thicknesses of .020 and .018 inch, respectively, the strip, in the embodiment illustrated in FIGS. 1-4, being preferably ¼ inch wide. The nail-like teeth forming the teeth of groups A are each preferably 5/16 inch in length and ⅛ inch wide, while the whisker-type teeth forming the teeth of groups B are each preferably 5/32 inch long and .035 inch wide, providing a preferred length to width ratio of about 4.45. This particular length of the teeth of group B has been found to be particularly effective in ¼ inch plywood and is satisfactory in other types of hardboard. For thicker sheet material, for example ⅜ inch, the whisker type teeth may be somewhat longer. It is thus seen that the whisker-type teeth employed with the usual ¼ inch plywood or other hardboard panels are extremely narrow and slender and, as noted hereinafter, this type of teeth and the present arrangements thereof provide excellent withdrawal characteristics in wall panels. To illustrate, the whisker-type teeth have, in the preferred forms employing 26 and 28 U.S. Standard gauge sheet metal, a width to strip metal thickness ratio of 1.75 and 1.94, respectively. These length and width characteristics provide for easy penetration of the whisker teeth into the wall panel as well as optional bending of the teeth during penetration to provide a lateral clinching action enhancing the individual cluster's resistance to withdrawal. It will be appreciated that, for thicker types of material, such as ½ inch plywood, the same type of teeth as are embedded into the studding may also be employed on the opposite face of the nail in lieu of the whisker-type teeth.

The ratio of the width or cross sectional area of the teeth forming the nail-like teeth of groups A to the width or cross sectional area of the whisker-type teeth forming the teeth of groups B is about 3.5, and this width or area ratio, with the strip formed to the foregoing dimensions and employing the nail-like teeth of groups A, should preferably be maintained at no less than about 3. The ratio of the total width or cross sectional area of the teeth forming each of the teeth groups A to the total width or cross sectional area of the teeth forming each of the teeth groups B in the embodiment illustrated in FIGS. 1-3 is 2.44 and is preferably maintained within a range of about 1.5 to 4 regardless of the particular embodiment of the teeth in either group. When the teeth of groups A and B are formed to this ratio, specifically when such whisker-type teeth have the above-noted configuration, lateral dimension, cross sectional area, and length, resistance to withdrawal in both the wallboard and studding is balanced and optimal.

The ratio of the total embedded volume of the teeth of groups A to the total embedded volume of the teeth of groups B in the embodiment illustrated in FIGS. 1-3 is about 4.70 and is preferably maintained no lower than 3 regardless of the particular embodiment of the teeth in either group.

The above-quoted length for the whisker-type teeth of group B is provided for a median wallboard hardness and can be employed for a large variety of boards. Where relatively soft wallboard, such as gypsum, is being applied to the studding, the whiskers should be slightly longer if their resistance to withdrawal in this type of material is to be within satisfactory limits and the whiskers accordingly may be formed to lengths, for example, of about 3/16 and 7/32 of an inch. For relatively hard wallboard, such as Masonite, the whisker-type teeth can be slightly shorter in length and still provide adequate resistance to withdrawal.

Figure 8:
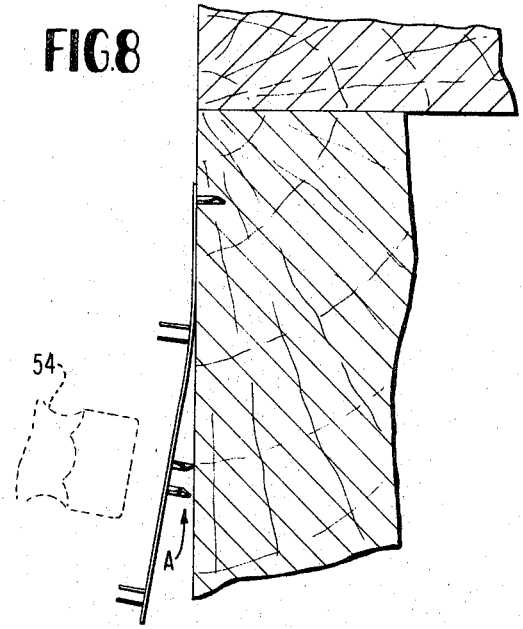
FIG. 8 is an enlarged fragmentary cross sectional view taken about on line 8—8 of FIG. 7.

The nailing strip, in the form hereof illustrated in FIGS. 1-3, may be applied at the job site or at a prefabrication assembly site and, when employed to form a wall panel to studding joint, the strip is preferably applied as follows. Assuming that a 4 foot by 8 foot panel is to be directly applied to the studding and that, as seen in FIG. 7, the studding comprises a plurality of upright studs 50, spaced laterally one foot four inches from each other and connected at opposite ends to headers 52, a workman preferably applies the tape-like strips 10 to each 4 foot by 8 foot section of the studding in the following manner. For each stud, the workman places the first strip 10 against the face of the stud such that the tips of the teeth of groups A project toward the stud and the tip of the end tooth lies against the uppermost face portion of the stud. The workman first drives the uppermost end tooth 12 or 14, as the case may be, to secure the upper end of the tape to the stud and then tensions the strip downwardly along the face of stud 50. Each of the remaining teeth of groups A can then be successively driven, i.e., by a hammer 54 (FIG. 8), into the stud such that the face of strip 10 from which the teeth of groups A project lies flush against the face of the stud and thus avoiding crimping and bowing of the nail strip. It will be seen that the preferred 2 inch spacing of whisker teeth groups B and the substantially medial location of the teeth groups A between adjacent teeth groups B permit a hammer head 54 to engage centrally between teeth groups B in a manner as to not strike or peen over the adjacent whisker teeth when nails 12 and 14 are driven into the studding 50. Indicia or marks 19 form guides to assist the carpenter in determining where to strike the strip without peening the teeth of groups B, i.e., the marks form a target for the hammer. Thus, with even minimal accuracy, a workman can apply the tape-like nail strips without rendering the whisker teeth ineffective. The spacing beween adjacent like groups of teeth should therefore be no less than 1¼ inches and no more than 4 inches if a strong and adequate joint is to be effected. The remaining strips are likewise applied in a similar manner and in slightly spaced end-to-end relation such that a substantially continuous connector strip is secured along the studs coextensive in length therewith. Note that nailing strips 10 are applied substantially centrally between the lateral edges of the innermost studs, while the nailing strips applied along the outermost studs, that is, the studs to which the lateral edges of the wall panel will be fastened, are located preferably centrally along each half of the face of such outermost studs as seen in FIG. 7 unless the nail employing the double row of teeth groups (FIGS. 9-11) and hereinafter described is utilized.

With all the nailing strips applied to the studding, the wall panel WP is applied against the 4 foot by 8 foot studding frame or stud wall. The workman then drives the wall panel toward studding 50 to embed the whisker-type teeth into the rear face of the wall panel. A rubber mallet is preferably used for this purpose, particularly when applying prefinished paneling. Specifically, the workman first drives the lower central portion of the wall panel toward the innermost stud 50 to embed the whisker-type teeth of the lowermost tape-like strip into the rear face of the wall panel. After joining, for example, about 2 feet of the lower central portion of the wall panel to the innermost studding, the workman then drives the lateral lower edges of the wall panel towards studding 50 joining the lower lateral panel edges to the outermost studding. The central portions of the wall panel are then secured to the innermost studs and the corresponding outer edge portions of the panel are secured to the outermost studs as before. This process is repeated in an upward direction along the wall panel until the latter is fully secured to the studding. In this manner, lateral and vertical bowing of the wall panel is precluded. It will of course be appreciated that the term panel as herein employed encompasses wallboard applied exteriorly of the stud frames, for example the sheating underlying housing exteriors of brick, clapboard, or the like as well as interior panelling.

Nailing strips can be provided along headers 52 if desired. However, in most applications, molding, not shown, would be provided along the upper and lower edges of the panel and it can be seen that such upper and lower edges can be secured to the headers by conventional nails, the molding covering the nail heads. The molding may also be secured by use of the nail strips hereof as described hereinafter with reference to FIG. 13.

Referring now to FIGS. 9–10, there is shown another embodiment of the hidden fastener nail strip hereof wherein like numerals as in the embodiment hereof illustrated in FIGS. 1–3 designate like parts, the numerals being followed by the letter designation $a$ when applied to the nail strip illustrated in FIGS. 9–10. There is shown an elongated tape like strip of sheet metal 10$a$, preferably 26 or 28 U.S. Standard gauge, having two lengthwise extending parallel rows of equally spaced groups or clusters of teeth alternately projecting from opposite faces thereof. Groups of like teeth indicated at A' project from one face of strip 10$a$ while groups of like teeth of a different type indicated at B' project from the opposite face of strip 10$a$. The groups of teeth indicated at A' and B' are formed similarly as the respective groups of teeth indicated at A and B in the embodiment hereof illustrated in FIGS. 5 and 6. Further description of the teeth groups A' and B' and their particular configuration and arrangement is believed unnecessary as each group is identically configured and arranged as the corresponding group in the embodiment illustrated in FIGS. 1–3.

The arrangement of the groups of teeth in each row are such that the groups of teeth A' and B' in each longitudinally extending row lie laterally adjacent to the corresponding groups of similar teeth A' and B' in the other row such that a pair of laterally adjacent light groups of teeth alternately project from opposite faces of strip 10$a$.

Strip 10$a$ is preferably formed of either 26 or 28 U.S. Standard gauge galvanized sheet metal and has a width preferably about ¾ inch. The teeth forming teeth groups A' are, as in the previous form, preferably 5/16 inch in length and ⅛ inch wide, while the whisker type teeth 20$a$, 22$a$ and 24$a$ foming the teeth of groups B' are each preferably 5/32 inch long and .035 inch wide. The lateral spacing between like teeth groups from the center line of each row is ½ inch and, as before, the longitudinally adjacent teeth groups are preferably on 1 inch centers whereby a 2 inch spacing is provided between the longitudinally next adjacent whisker teeth so that the same are not peened when the strip is applied.

Referring now to FIG. 11, the double row nailing strip may be applied, as before, to the studding with the tips of the teeth of teeth groups A' projecting toward the stud 50$a$ and the end tooth A' lying against the uppermost face portion of the stud. The carpenter then drives the uppermost end tooth 18$a$ and successively drives the remaining teeth groups A' into stud 50$a$. As before, marks 19$a$ are provided and form a guide or target for the carpenter designating the area of the plate to be struck by the hammer whereby the teeth of teeth groups B' will not be peened thereby. The spacing between longitudinally adjacent like groups of teeth B' should be no less than 1¼ inches and no more than 4 inches if the teeth B' are not to be peened over or the joint rendered ineffective or have insufficient strength. The remaining strips are likewise applied in a similar manner along the remaining portions of the stud in spaced end-to-end relation such that a continuous double row connector strip is fastened along the studs coextensive in length therewith. After the nailing strips are applied to the studding, the carpenter locates the wall panel against the outwardly projecting teeth groups B' and drives the wall panel towards the studding to embed these teeth into the rear face of the wall panel. The method of applying the wall panel to the nail having the double row of teeth groups is similar to the method employed in securing the wall panel to the studding with the nail having the single row of teeth groups, i.e., the carpenter first drives the lower central portion of the wall panel toward the innermost stud and then drives the lower edges of the wall panel towards the studding 50. This manner of driving the wall panel toward the studding is repeated at various heights along the wall panel until it is finally secured to the studding.

It will be noted that the lateral edges of the wall panel are embedded into the nearest row of teeth groups B' of the associated nailing strip 10$a$ leaving the adjacent row of teeth groups B' free or fully exposed whereby the lateral edge portion of an adjoining wall panel can be secured in a like manner to such other teeth row. As seen in FIG. 11, the fastener 10$a$ underlying the edge portions of adjacent panels is common to and secures both wall panels to the stud 50$a$. It will thus be appreciated that the lateral load between adjoining panels is transferred from the one panel to the other through the double row nail strip without being transmitted through the stud. This loading is transferred directly through the portion of the metal intermediate the laterally adjacent teeth groups B' without being transmitted to the stud and hence without transferring lateral or bending forces to the teeth of groups A'. Adjoining panels are thus directly spliced one to the other through the fastener.

It will be appreciated that the various forms of fastener strips herein illustrated and described can be employed to join molding, trim, door and window jambs, as well as other wooden members appurtenant to wooden building construction and other types of building members which will receive a nail to their associated supporting structure. For example, a door jamb is illustrated in FIG. 12 and comprises a supporting frame member 60 and a jamb member 62 secured thereto by means of the hidden fastener hereof. It will be seen that the teeth clusters A' of the nail strip 10$a$ illustrated in FIGS. 9–10 are embedded into the support member 60 similarly as previously described. The jamb 62 can thus be butted against the tips of the teeth of the tooth groups B' and the jamb secured to the supporting structure by hammering the jamb as by a rubber mallet toward member 60 whereby the teeth groups B' are embedded into the rear face of the jamb 62. It has been found that the jamb-support member joint is fully able to withstand the shearing forces applied thereto even under the slamming force of a door against the jamb.

As a further example of the many and widespread uses to which the hidden fastener hereof may be applied, there is illustrated in FIG. 13 a floor trim comprising a length of quarter round 64 which is secured to a molding 66 which, in turn, is secured to sheathing or panelling 68. In the illustrated form, a hidden fastener of the type having the single row of teeth groups illustrated in FIGS. 1–3 is employed with preferably a pair of nail strips 10 first secured to the panelling 68 by embedding the teeth of teeth groups A thereof into panelling 68 in a manner as previously described. The molding 66 can then be butted against the teeth of teeth groups B and finally secured to the panelling 68 by driving the molding 66 toward the panelling by a mallet to embed the teeth of teeth groups A into the molding. Likewise, the strip 10 can be secured to the lower outer face portion of the molding 66 and the quarter round 64 can be butted against the teeth of tooth clusters B. Again, a rubber mallet is employed to drive the quarter round toward the supporting sheathing 66 whereby the tooth clusters B are embedded into the rear face of the quarter round finally securing the quarter round to the molding and to the supporting structure. It will, of course, be appreciated that either of the single row or double row hidden fasteners hereof may be employed to secure the door jamb illustrated in FIG. 12 or the quarter round and trim illustrated in FIG. 13 to its associated supporting structure.

It is a significant feature hereof that as wall panel WP, jamb 62, quarter round 64, molding 66 or the like is pressed toward the associated support structure, the scarf-pointed tips of the whisker-type teeth of groups B provide a clinching action whereby the resistance to withdrawal of the supported structure from the fastener is increased. When employing the nail strip 10 having the triangularly arranged whisker-type teeth, the scarf-pointed tips 26 and 28 of base teeth 20 and 22 diverge laterally while the beveled tips 30 of teeth 24 incline forwardly away from base teeth 20 and 22, thereby providing a triangular clinching action. It will be seen that a laterally divergent clinching action is also provided when the teeth 36, 40 and 42 of the whisker-type teeth arrangements illustrated in FIGS. 5 and 6 are embedded into the structure to be supported, i.e., when the wall panel is pressed toward the stud. A clinching action also occurs when the teeth 12 and 14 are nailed to the supporting structure, i.e., studding 50, 50a, due to the bending action caused by their scarfed points. The teeth of the nail strip are thus clinched into both the supporting and supported structure, i.e., the studding and wall panel.

It has been shown experimentally that the foregoing described strip has excellent and optimal withdrawal characteristics. For example, it has been found that the whisker-type teeth arranged in the preferred triangular configuration have a resistance to withdrawal of about 5 pounds per cluster of whiskers when such whiskers are fully embedded in Duragard Bayon Pecan tempered hardboard. Similarly, when the whisker-type teeth arranged in the foregoing triangular configuration and having the preferred dimensions are embedded into Luan Mahogany Paneling 3-Ply Plywood, the resistance to withdrawal of each cluster of whisker-type teeth is about 4.1 pounds. Thus, the holding properties of the present nailing strips have proven to be exceedingly higher than anticipated providing an effective and strong wall panel to stud joint.

The foregoing described type of wall panel to stud connection also provides the wall panel WP with a sound absorbing property by permitting limited vibration of wall panel WP relative to stud 32 whereby acoustical energy is dissipated. As will be seen in greatly exaggerated form in FIG. 9, the longitudinal spacing of the teeth of one group from the teeth of the other group along the strip 10, coupled with the unique configuration thereof providing high resistance to withdrawal from both the wall panel and the studding, forms a bridging effect between next adjacent groups of teeth provided by the metal strip portion 58 therebetween. As illustrated, wall panel WP is secured to the groups of teeth B projecting from the outer face of strip 10 which, in turn, is secured to studding 32 solely by the groups of teeth A projecting from the inner face of strip 10. By longitudinally spacing the wall panel to fastener connection provided by the teeth of groups B from the fastener to studding connection provided by the teeth of groups A, thereby eliminating the straight-through wall panel to studding connection, the sole connection between the wall panel WP and studding 32 comprises the metal strip portion 58 lying between adjacent groups of teeth A and B. Since strip 10 is tape-like and flexible to a very limited extent when lying between the wall panel and stud, the metal portion 58 provides a spring-type or flexible connection permitting limited vibratory movement of wall panel WP relative to studding 50. Wall panel WP can thus move slightly outwardly of the stud 50 to a very limited extent, connected thereto only by spring metal portions 58. Wall panel WP is thus free for limited vibratory movement by flexing action of strip portions 58 whereby panel WP dissipates acoustical energy and thereby provides a quieting or soundproofing action.

It is thus seen that the objects of the present invention are fully accomplished in that there is provided an improved type of hidden fastener for forming lap joints which fastener may be economically formed, readily and easily applied. The joint formed with the nail strips hereof have proven high strength and holding characteristics principally due to the configuration and arrangement of the whisker-type teeth. Moreover, the present fastener is formed to permit limited vibration of the supported structure relative to the supporting structure for acoustical energy dissipation providing for example a wall panel to studding construction with a sound absorbing property.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastener strip for forming lap joints wherein the strip is sandwiched between the members of the joint comprising an elongated tape-like strip of sheet metal, first tooth means comprising plural groups of at least two teeth each, the groups being struck from said strip at longitudinally spaced positions therealong and projecting substantially normal to said strip from one face thereof for embedment into a member of the joint, each group of teeth comprising at least a pair of teeth struck to project in lateral spaced relation one to the other, said sheet metal strip having a thickness no greater than .030 inch, at least one of said laterally spaced teeth of said said first tooth means having a width to maximum metal thickness ratio no greater than 3, second tooth means comprising plural groups of at least two teeth each, the second groups being struck from said strip at longitudinally spaced positions therealong and projecting substantially normal to said strip from the opposite face thereof for embedment into the opposite member of the joint, said latter two teeth lying in longitudinal spaced back-to-back relation one to the other, said first and second groups of teeth being longitudinally spaced along said strip each from the other with the face portions of said strip lying between next adjacent like groups of teeth on opposite sides of said strip comprising planar surfaces free of protuberances, the groups of teeth of at least one of said first and second tooth means being formed to provide a clinching action upon embedment into the associated joint member.

2. A fastener according to claim 1 wherein the adjacent groups of teeth comprising said first tooth means are spaced one from the other a distance no less than 2 inches and no greater than 4 inches, the groups of teeth comprising said second tooth means lying substantially equal distances between the adjacent groups of teeth comprising said first tooth means, at least one of the teeth of each group comprising said first tooth means having a length to width ratio of no less than 3.

3. A fastener according to claim 1 wherein at least one of the teeth comprising each of the second groups of teeth has a width to maximum metal thickness ratio greater than 4.

4. A fastener according to claim 3 wherein said strip comprises 28 U.S. Standard gauge sheet metal and has a width no greater than ¼ inch.

5. A fastener according to claim 1 wherein said sheet metal strip has a thickness no greater than .025 inch, said laterally spaced teeth of said first tooth means having width to maximum metal thickness ratios no greater than 2, the ratio of the cross sectional area of at least one of the teeth comprising each of the second groups of teeth to the cross sectional area of at least one of the teeth comprising each of the first groups of teeth being no less than 2.5.

6. A fastener according to claim 5 wherein the strip comprises 26 U.S. Standard gauge sheet metal and has a width no greater than ¼ inch.

7. A fastener according to claim 1 wherein the number of groups of teeth comprising said second tooth means is one more than the number of groups of teeth comprising said first tooth means, each of the groups of said second tooth means lying adjacent the opposite ends of said strip comprising only one of said pair of teeth whereby the extremities of the strip may be embedded in said opposite joint member.

8. A fastener according to claim 1 wherein each of said latter two teeth has an edge inclined relative to its longitudinally extending tooth axis whereby said latter two teeth provide a clinching action upon embedment into the opposite joint member.

9. A fastener according to claim 1 wherein said first pair of teeth are struck from said strip with the slots left thereby extending in like longitudinal directions, the groups of teeth comprising said first tooth means each including a third tooth longitudinally spaced from said first pair of teeth and struck from said strip with the slot left thereby extending in an opposite longitudinal direction, said strip having a metal thickness no greater than .025 inch and a width no greater than ¼ inch, said first pair of teeth and said third tooth having a width to maximum metal thickness ratio no greater than 2.

10. A fastener according to claim 9 wherein the adjacent groups of teeth comprising said first tooth means are spaced one from the other a distance no less than 2 inches and no greater than 4 inches, the groups of teeth comprising said first and second tooth means lying substantially equidistant from each other, at least one of the teeth of each group comprising said first tooth means having a length to width ratio of no less than 3.

11. A fastener according to claim 9 wherein each of the groups of teeth comprising the first tooth means include a fourth tooth, said third and fourth teeth being struck to lie in spaced side-by-side relation one to the other and in longitudinally spaced back-to-back relation with said first pair of teeth, the slots left in said strip by said fourth tooth extending in a like longitudinal direction as the slot left by said third tooth.

12. A fastener according to claim 11 wherein the slots left in said strip lie within the lateral confines of the strip and spaced inwardly from the edges thereof, the ratio of the cross sectional area of each of the teeth comprising the second groups of teeth to the cross sectional area of each of the teeth comprising the first groups of teeth being no less than 2.5.

13. A fastener according to claim 12 wherein said third tooth is struck to form an isosceles triangular configuration with said first pair of teeth, the inclined edges of said first pair of teeth extending in opposite lateral directions, said third tooth having an inclined edge extending substantially longitudinally of the strip whereby a triangular clinching action is provided upon embedment thereof into one of the joint members.

14. A fastener according to claim 1 wherein at least one of said first and second teeth groups are struck from said strip to provide a pair of transversely spaced generally parallel longitudinally extending rows of teeth groups along opposite edge portions of the associated strip face.

15. A fastener according to claim 1 wherein said first tooth means includes a pair of said first teeth groups lying in lateral spaced relation one to the other at each of the longitudinally spaced positions along said strip associated with said first teeth groups whereby said first teeth groups form a pair of laterally spaced generally parallel longitudinally extending rows of teeth along said one face of said strip.

16. A fastener according to claim 1 wherein said second tooth means includes a pair of said second teeth groups lying in lateral spaced relation one to the other at each of the longitudinally spaced positions along said strip associated with said second teeth groups whereby said second teeth groups form a pair of laterally spaced generally parallel longitudinally extending rows of teeth along said opposite strip face.

17. A fastener according to claim 1 wherein said first tooth means includes a pair of said first teeth groups lying in lateral spaced relation one to the other at each of the longitudinally spaced positions along said strip, said second tooth means including a pair of said second teeth groups lying in lateral spaced relation one to the other at each of the longitudinally-spaced positions along said strip associated with said second teeth groups whereby said first and second teeth groups form a pair of laterally-spaced generally parallel longitudinally extending rows of teeth along opposite faces of said strip.

18. A fastener according to claim 1 including indicia on said one face of said strip overlying said second teeth groups intermediate said first teeth groups.

19. A fastener strip according to claim 1 wherein each of said first pair of teeth are struck from said strip with the slots left thereby extending in like longitudinal directions, the slots of each pair of teeth being laterally spaced one from the other leaving a metal portion of said strip therebetween.

20. A fastener according to claim 1 wherein said first and second groups of teeth are alternately spaced along said strip.

21. A fastener strip for forming lap joints wherein the strip is sandwiched between the members of the joint comprising an elongated tape-like strip of sheet metal, first tooth means comprising plural groups of at least two teeth each, the groups being struck from said strip at longitudinally spaced positions therealong and projecting substantially normal to said strip from one face thereof for embedment into a member of the joint, and second tooth means comprising plural groups of at least two teeth each, the second groups being struck from said strip at longitudinally spaced positions therealong and projecting substantially normal to said strip from the opposite face thereof for embedment into the opposite member of the joint, said first and second groups of teeth being longitudinally spaced along said strip each from the other with the face portions of said strip lying between next adjacent like groups of teeth on opposite sides of said strip comprising planar surfaces free of protuberances, the ratio of the total cross sectional area of the teeth forming each of the second teeth groups to the total cross sectional area of the teeth forming each of the first teeth groups lying within a range of about 1.5 to 4.

22. A fastener according to claim 21 wherein at least one of said first and second teeth groups are struck from said strip to provide a pair of transversely spaced generally parallel longitudinally extending rows of teeth groups along opposite edge portions of the associated strip face.

23. A fastener strip according to claim 21 wherein said first and second groups of teeth are alternately spaced along said strip.

24. A fastener strip for forming lap joints wherein the strip is sandwiched between the members of the joint comprising an elongated tape-like strip of sheet metal, first tooth means comprising plural groups of at least two teeth each, the groups being struck from said strip at longitudinally spaced positions therealong and projecting substantially normal to said strip from one face thereof for embedment into a member of the joint, and second tooth means comprising plural groups of at least two teeth each, the second groups being struck from said strip at longitudinally spaced positions therealong and projecting substantially normal to said strip from the opposite face thereof for embedment into the opposite member of the joint, said first and second groups of teeth being longitudinally spaced along said strip each from the other with the face portions of said strip lying between next adjacent like groups of teeth on opposite sides of said strip comprising planar surfaces free of protuberances, the ratio of the total embedded volume of the teeth forming each of the second teeth groups to the total embedded volume of the teeth forming each of the first teeth groups being no lower than 3.

25. A fastener strip according to claim 24 wherein the ratio of the total embedded volume of the teeth forming each of the second teeth groups to the total embedded volume of the teeth forming each of the first teeth groups is no lower than 3.

26. A fastener according to claim 24 wherein at least one of said first and second teeth groups are struck from said strip to provide a pair of transversely spaced generally parallel longitudinally extending rows of teeth groups along opposite edge portions of the associated strip face.

27. A fastener strip according to claim 24 wherein said first and second groups of teeth are alternately spaced along said strip.

28. A fastener strip for forming lap joints wherein the strip is sandwiched between the members of the joint comprising an elongated tape-like strip of sheet metal, first tooth means comprising plural groups of at least two teeth each, the teeth groups being struck from said strip at longitudinally and laterally spaced positions therealong to form two laterally spaced generally parallel longitudinally extending rows of longitudinally spaced teeth groups, the teeth of each group projecting substantially normal to said strip from one face thereof for embedment into a member of the joint, and second tooth means comprising plural groups of at least two teeth each, the second teeth groups being struck from said strip at longitudinally spaced positions therealong to form at least one longitudinally extending row of longitudinally spaced teeth groups, the teeth of each said second groups of teeth projecting substantially normal to said strip from the opposite face thereof for embedment into the opposite member of the joint, said first and second groups of teeth being spaced longitudinally along said strip each from the other with the face portions of said strip lying between next adjacent longitudinally spaced groups of teeth on opposite sides of said strip comprising planar surfaces free of protuberances.

29. A fastener according to claim 28 wherein said sheet metal strip has a thickness no greater than .030 inch, at least one of the teeth of each said first teeth groups having a width to maximum metal thickness ratio no greater than 3.

30. A fastener according to claim 29 wherein the teeth forming said first teeth groups are formed to provide a clinching action upon embedment into the member of the joint.

31. A fastener according to claim 28 wherein the face portions of the strip lying between the laterally spaced first teeth groups comprise planar surfaces free of protuberances, the lateral width of said face portion being about ½ the overall width of the plate.

32. A fastener according to claim 28 wherein the second groups of teeth are struck from said strip at laterally spaced positions therealong to form two laterally spaced generally parallel longitudinally extending rows of longitudinally spaced teeth groups.

33. A fastener strip according to claim 28 wherein said first and second groups of teeth are alternately spaced along said strip.

References Cited
UNITED STATES PATENTS

| | | |
|---|---|---|
| 1,089,878 | 3/1914 | Steinhauser. |
| 1,324,483 | 12/1919 | Upson _____ 85—14 |
| 2,084,544 | 6/1937 | Wilson. |
| 2,339,841 | 1/1944 | Deuchler et al. _____ 85—13 X |
| 3,261,137 | 7/1966 | Jureit _____ 85—13 X |
| 3,364,805 | 1/1968 | Sanford _____ 85—13 |
| 3,382,752 | 5/1968 | Black et al. _____ 85—13 |

RAMON S. BRITTS, Primary Examiner

U.S. Cl. X.R.

52—363, 483; 287—20.92